(12) United States Patent
Naik et al.

(10) Patent No.: US 11,455,664 B2
(45) Date of Patent: Sep. 27, 2022

(54) SYSTEM AND METHOD FOR ENABLING AND PERFORMING SERVICES AND FUNCTIONALITIES ACROSS DEVICE TYPES AND SERVICE PROVIDERS WITHIN A COMMUNICATION DEVICE

(71) Applicant: Saankhya Labs Private Limited, Bangalore (IN)

(72) Inventors: Parag Naik, Bangalore (IN); Vivek Kimbahune, Bangalore (IN)

(73) Assignee: SAANKHYA LABS PRIVATE LIMITED, Bangalore (IN)

( * ) Notice: Subject to any disclaimer, the term of this patent is extended or adjusted under 35 U.S.C. 154(b) by 219 days.

(21) Appl. No.: 14/137,657

(22) Filed: Dec. 20, 2013

(65) Prior Publication Data
US 2014/0164106 A1    Jun. 12, 2014

(51) Int. Cl.
| | |
|---|---|
| G06Q 30/00 | (2012.01) |
| G06Q 30/02 | (2012.01) |
| H04L 67/00 | (2022.01) |
| H04L 67/567 | (2022.01) |

(52) U.S. Cl.
CPC ......... *G06Q 30/0277* (2013.01); *H04L 67/34* (2013.01); *H04L 67/567* (2022.05)

(58) Field of Classification Search
CPC ................. G06Q 30/0251; G06Q 30/0277
USPC .......................................................... 705/14
See application file for complete search history.

(56) References Cited

U.S. PATENT DOCUMENTS

| | | | |
|---|---|---|---|
| 2007/0132860 A1* | 6/2007 | Prabhu et al. | 348/231.3 |
| 2007/0214051 A1* | 9/2007 | Johnson et al. | 705/14 |
| 2008/0154908 A1* | 6/2008 | Datar et al. | 707/10 |
| 2011/0282793 A1* | 11/2011 | Mercuri et al. | 705/80 |
| 2012/0151100 A1* | 6/2012 | Roche et al. | 710/16 |
| 2013/0083150 A1* | 4/2013 | Howarter et al. | 348/14.03 |
| 2015/0193833 A1* | 7/2015 | Sankaran et al. | G06Q 30/0277 |

OTHER PUBLICATIONS

Das, G. A new chip co movement: India was always globally renowned for its semiconductor design services. but a few entrepreneurs are now going several steps ahead to make indigenous chips as well. Business Today, Nov. 25, 2012 (Year: 2012).*
Case, L.,. Update the firmware on your HDTV, camera, smartphone, PC, and more. PC World, Nov. 30, 2010 (Year: 2010).*

* cited by examiner

Primary Examiner — Matthew L Hamilton

(57) ABSTRACT

A method for enabling services and functionalities across device types and service providers within a communication device includes processing a first device function type, a first service type, and a first cost function from the device, obtaining a first firmware and communicating the first firmware to the communication device for execution, activating a first set of service enabling instructions to enable a first service and a first functionality associated with the first firmware when the first firmware is executed on the communication device, processing a second device function type, a second service type, and a second cost function from the device, obtaining a second firmware to be executed on the device, communicating the second firmware to the device, and activating a second set of service enabling instructions to enable a second service and a second functionality associated with the second firmware when the second firmware is executed on the device.

8 Claims, 17 Drawing Sheets

| 702 USER | 704 DEVICE TYPE | 706 DEVICE FUNCTION TYPE | 708 SERVICE USED | 710 SERVICE OPERATOR USED | 712 FREQUENCY OF SERVICES USED | 714 COST FUNCTION PREFERENCES | 716 PAYLOAD ACCESSED |
|---|---|---|---|---|---|---|---|
| JOHN DOE | SET-TOP BOX | MODEM | BROADBAND/INTERNET | ISP 1 | 2 TIMES | LOW PRICE | AUDIO |
| JOHN DOE | MOBILE PHONE | MODEM | WIFI/4G | ISP 2 | 5 TIMES | SPEED | VIDEO |
| MARC | TELEVISION | MOBILE PHONE | VOICE | MOBILE OPERATOR 1 | 3 TIMES | QUALITY | ISD CALLS |
| MARC | MOBILE PHONE | TELEVISION | DTH | DTH OPERATOR 1 | 3 TIMES | LOW PRICE | SPORTS CHANNEL |
| MARC | TELEVISION | TELEVISION | DTH – ADD ON PACKAGE | DTH OPERATOR 2 | 4 TIMES | QUALITY | REALITY SHOWS |

FIG. 7

SYSTEM AND METHOD FOR ENABLING AND PERFORMING SERVICES AND FUNCTIONALITIES ACROSS DEVICE TYPES AND SERVICE PROVIDERS WITHIN A COMMUNICATION DEVICE

BACKGROUND

Technical Field

The embodiments herein generally relate to providing functionalities to communication devices, and, more particularly, to a system and method for enabling and performing services and functionalities across device types and service providers within a communication device.

Description of the Related Art

All electronic devices including Televisions, Ultra books, laptops, personal computers (PCs), tablet PCs, mobile phones, set-top-boxes, recorders, home gateways, navigational aids, surveillance & monitoring systems, infotainment solutions for road, rail, air and sea etc are designed to handle one or more functions like computing, communication, entertainment, navigation and/or sensing. Due to advancement in technology, all these devices have transformed and acquired multiple properties transcending their core application areas. These devices typically termed as SMART devices, have a reasonable degree of computing power, communication and entertainment quotient, and sensing capabilities.

For example, traditional TVs were confined to entertainment, but latest technologies have enabled manufacturers to develop SMART TVs that have greater computing, communication and sensing capabilities. While TV content continues to remain the same more or less, the transmission medium varies. Consumers rely on one or multiple service operators (e.g., cable operators, Free-to-Air broadcasters, satellite TV providers, etc.) to fulfill their entertainment needs. Currently, most of the service providers offer their own Set top boxes to their subscribers. Such set-top boxes offer pre-determined services due to a variance in broadcast technology and conditional access adopted by the service operators, for which the consumers are compelled to view the TV programs, thus limiting their choice.

The mobile industry is adopting new communication/data standards at a faster rate than ever before. Spectrum is a scarce resource and service operators need greater spectral efficiency to support additional users and new throughput-hungry applications. Moreover, different countries adopt different bands for mobile communications. This imposes a huge challenge for the mobile phone manufacturers as well as the consumers. Originally, mobile phones were just communication devices that operate on different technologies such as GSM, CDMA. With different countries/operators adopting different bands, the mobile phone manufacturers started offering single band, dual band, Tri-band, or Quad band handsets. Technological advancements over the years, empowered the mobile phones to support several additional functionalities and are now popularly known as SMART phones.

To support multiple functions and features, the mobile phone manufacturers use different chipsets for GSM, CDMA, FM, Bluetooth, Wi-Fi, wireless modems (e.g., 3G, and 4G), and/or TV reception capabilities. If a customer wants to use a function or a feature that is not inherently supported by the phone, he/she has to change the equipment to migrate from one technology to another. Thus, the consumer does not have the flexibility and the freedom to use the functions and features at will.

One such example is voice and data usage service in the mobile industry, which imposes a huge challenge for service operators to scale up and guarantee quality of service (QoS) at a reasonable cost. Due to constant access of the same network at the same instance, there is network clogging which results in drop of signal strength & quality. As a consequence, the consumers have to either (i) bear additional cost for improved services, (ii) be satisfied with inadequate bandwidth, inconsistent service, and compromise in signal/call quality, (iii) switch to a different service operator, and/or (iii) change his/her equipment.

FIG. 1A illustrates a typical distribution of one or more services to one or more user devices 108A-N associated with one or more users 110A-N from one or more service operators 102A-N via one or more networks 104A-N. As shown in FIG. 1A, a cable operator 102A provides broadcasting reception to one or more user devices (e.g., a user device 108A—a television) via a network 104A. The cable operator 102A either provides the broadcasting reception directly via a cable, or a locally available set top box (e.g., a set top box 106A) via a first network 104A.

Similarly, a free to air (FTA) Terrestrial/Satellite television operator 102B provides broadcasting reception to their subscribers by installing a set top box 106B at the subscriber's premises which is typically connected to a television (e.g., the user device 108A—the television) via a second network 104B. Similarly, a broadband/internet operator 102C provides a broadband/internet connection by providing (i) a Wi-Fi modem/router 106C-106N, or a direct connection (typically using a RJ 45 or CAT 5/6 cable) to a user device 108C (e.g., a personal computer or a laptop) via a third network 104C. Similarly, the mobile operators provide data and voice usage services to a user device 108N (e.g., mobile communication device) via a fourth network 104N.

FIG. 1B illustrates the user device 108A-N of FIG. 1A that includes more than one hardwired chipset such as a television (TV) demodulator 112, a radio demodulator 114, a data demodulator 116, and a communication receiver 118. Although, the user devices 108A-N include hardwired multiple chipsets to support multiple bands, technologies to provide enhanced functionalities, not all the hardwired multiple chipsets are used for functionality. This results in system overhead and adds unnecessary cost on account of multiple chipsets in the user device. Therefore there is a tradeoff between cost, no of chipsets in the user device, SMART functionality, and services. While SMART functionality is good to have, the key challenge is to strike a balance between cost, functionality and service.

SUMMARY

In view of the foregoing, an embodiment herein provides a portal server for enabling services and functionalities across device types and service providers within a communication device. The portal server includes a processor, a memory storing (i) a database that stores one or more service enabling instructions, (ii) instructions to configure the processor, the processor processes a first device function type, a first service type, and a first cost function from the communication device, and the communication device includes a hardware component that is specific to a first service provider, a firmware identification module, when executed by the processor, identifies a first firmware that is configured to be executed on the communication device, a firmware selection and retrieving module that is configured to retrieve the first firmware from the database and communicate the first firmware to the communication device, and a service enabling module that is configured to activate a first set of service enabling instructions to enable a first service and a first functionality associated with the first firmware when the first firmware is executed on the communication device. The processor is further configured by the instructions to: process a second device function type, a second service type, and a second cost function from the communication device. The firmware identification module, when executed by the processor, further identifies a second firmware that is configured to be executed on the communication device based on the second device function type, the second service type, and the second cost function. The firmware selection and retrieving module, when executed by the processor, further retrieves the second firmware from the database and communicates the second firmware to the communication device. The service enabling module, when executed by the processor, further activates a second set of service enabling instructions to enable a second service and a second functionality associated with the second firmware when the second firmware is executed on the communication device, wherein the second service and the second functionality associated with the second firmware specific to a second service provider, are enabled for the same hardware component. Each of the one or more service enabling instruction set is specific to at least one firmware.

The processor is configured by the instructions to analyze activities performed on the first functionality associated with the first firmware and the second functionality associated with the second firmware. The activities include interaction with a payload. The processor is configured by the instructions to deliver an advertisement targeted to the communication device based on the activities. The communication device is selected from a group that includes a television (TV), a personal computer (PC), a laptop, a personal digital assistant (PDA), a mobile communication device, a set-top-box, or home gateways. The first service and the second service are enabled at the communication device based on bidding prices obtained from a set of service providers. The advertisement includes at least one of (i) an offer, and (ii) a discount on a service. The advertisement is based on a payload type.

The cost function is selected from a group that includes speed, performance, quality, reliability, price, or combinations thereof. The first service and the second service are selected from a group comprising a local cable service, a free-to-air (FTA) terrestrial or satellite service, an IPTV service, an internet service, and a call service. The first service and the second service are enabled as a free service or a pay per usage service based on the payload type.

In another aspect, a method for enabling broadcast reception and modem functionalities in a communication device is provided. The method includes processing, by a processor, a first device function type, a first service type, and a first cost function from the communication device, and the communication device includes a hardware component that is specific to a first service provider, obtaining, from a database, a first firmware that is configured to be executed on the communication device based on the first device function type, the first service type, and the first cost function, communicating the first firmware to the communication device, activating, using a service enabling module, a first set of service enabling instructions to enable a first service and a first functionality associated with the first firmware when the first firmware is executed on the communication device, processing, by the processor, a second device function type, a second service type, and a second cost function from the communication device, obtaining, from the database, a second firmware that is configured to be executed on the communication device based on the second device function type, the second service type, and the second cost function, communicating the second firmware to the communication device, and activating, using the service enabling module, a second set of service enabling instructions to enable a second service and a second functionality associated with the second firmware when the second firmware is executed on the communication device. The second service and the second functionality associated with the second firmware specific to a second service provider, are enabled for the same hardware component.

Activities performed on the first functionality and the second functionality may be analyzed using an activity analysing module. The activities include interaction with a payload. An advertisement targeted to the communication device may be delivered based on the activities.

In yet another aspect, a portal server for enabling services and functionalities in a communication device is provided. The portal server includes a processor, a memory storing (i) a database that stores one or more service enabling instructions, (ii) instructions to configure the processor, the processor is configured by the instructions to: process a first device function type, a first service type, and a first cost function from the communication device, and the communication device includes a hardware component that is specific to a first service provider, a firmware identification module, when executed by the processor, identifies a first firmware that is configured to be executed on the communication device, a firmware selection and retrieving module that is configured to retrieve the first firmware from the database and communicate the first firmware to the communication device, a service enabling module that is configured to activate a first set of service enabling instructions to enable a first service and a first functionality associated with the first firmware when the first firmware is executed on the communication device. Each of the one or more service enabling instruction set is specific to at least one firmware. The processor is further configured by the instructions to: process a second device function type, a second service type, and a second cost function from the communication device. The first device function type and the second device function type are selected from a group that includes a television, a mobile communication device, a set-top-box, or home gateways. The first service type and the second service type are selected from a group that includes a local cable service, a free-to-air (FTA) terrestrial or satellite service, an IPTV service, an internet service, a call service, an SMS service, or any value added service. The first cost function and the second cost function are selected from a group that includes speed, performance, quality, reliability, price, or combinations thereof, wherein the first device function type and the second device function type are different from each other. The firmware identification module, when executed by the processor, further identifies a second firmware that is configured to be executed on the communication device. The firmware selection and retrieving module, when executed by the processor, further retrieves the second firmware from the database and communicates the second firmware to the communication device. The service enabling module, when executed by the processor, further activates a second set of service enabling instructions to enable a second service and a second functionality associated with the second firmware when the second firmware is executed on the communication device. The second service and the second functionality associated with the second firmware specific to a second service provider, are enabled (i) for the same hardware component. The second service and the second functionality associated with the second firmware specific to a second service provider, are enabled without adding another hardware component in the communication device.

In a further aspect, a communication device for performing services and functionalities across device types and service providers, said communication device is provided. The communication device includes a processor, and a memory storing (i) a database that stores one or more firmwares each specific to a service provider, (ii) instructions to configure the processor, the processor is configured by the instructions to: communicate a first device function type, a first service type, and a first cost function to a portal server, and the communication device includes a hardware component that is specific to a first service provider, download a first firmware configured to be executed on the communication device, process an input that includes an indication to execute the first firmware. A first service and a first functionality associated with the first firmware are enabled for the hardware component when the first firmware is executed on the communication device. The processor is further configured to communicate a second device function type, a second service type, and a second cost function to the portal server, download a second firmware configured to be executed on the communication device, process an input that includes an indication to execute the second firmware. A second service and a second functionality associated with the second firmware are enabled for the same hardware component when the second firmware is executed on the communication device. The first device function type and the second device function type are selected from a group that includes a television, a mobile communication device, a set-top-box, or home gateways. The first service type and the second service type are selected from a group comprising a local cable service, a free-to-air (FTA) terrestrial or satellite service, an IPTV service, an internet service, a call service, an SMS service, or any value added service. The first cost function and the second cost function are selected from a group that includes speed, performance, quality, reliability, price, or combinations thereof, wherein the first device function type and the second device function type are different from each other.

In yet further aspect, a method for performing services and functionalities across device types and service providers within a communication device is provided. The method includes communicating a first device function type, a first service type, and a first cost function to a portal server, and the communication device includes a hardware component that is specific to a first service provider, downloading a first firmware configured to be executed on the communication device, processing an input that includes an indication to execute the first firmware. A first service and a first functionality associated with the first firmware are enabled for the hardware component when the first firmware is executed on the communication device. The method further includes communicating a second device function type, a second service type, and a second cost function to the portal server, downloading a second firmware configured to be executed on the communication device, and processing an input that includes an indication to execute the second firmware. A second service and a second functionality associated with the second firmware are enabled for the same hardware component when the second firmware is executed on the communication device. The first device function type and the second device function type are selected from a group that includes a television, a mobile communication device, a set-top-box, or home gateways. The first service type and the second service type are selected from a group that includes a local cable service, a free-to-air (FTA) terrestrial or satellite service, an IPTV service, an internet service, a call service, an SMS service, or any value added service. The first cost function and the second cost function are selected from a group that includes speed, performance, quality, reliability, price, or combinations thereof. The first device function type and the second device function type are different from each other.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 7 illustrates a table view of the activity analysing module of the portal server of FIG. 2 according to an embodiment herein;

DETAILED DESCRIPTION OF PREFERRED EMBODIMENTS

Figure 1A:
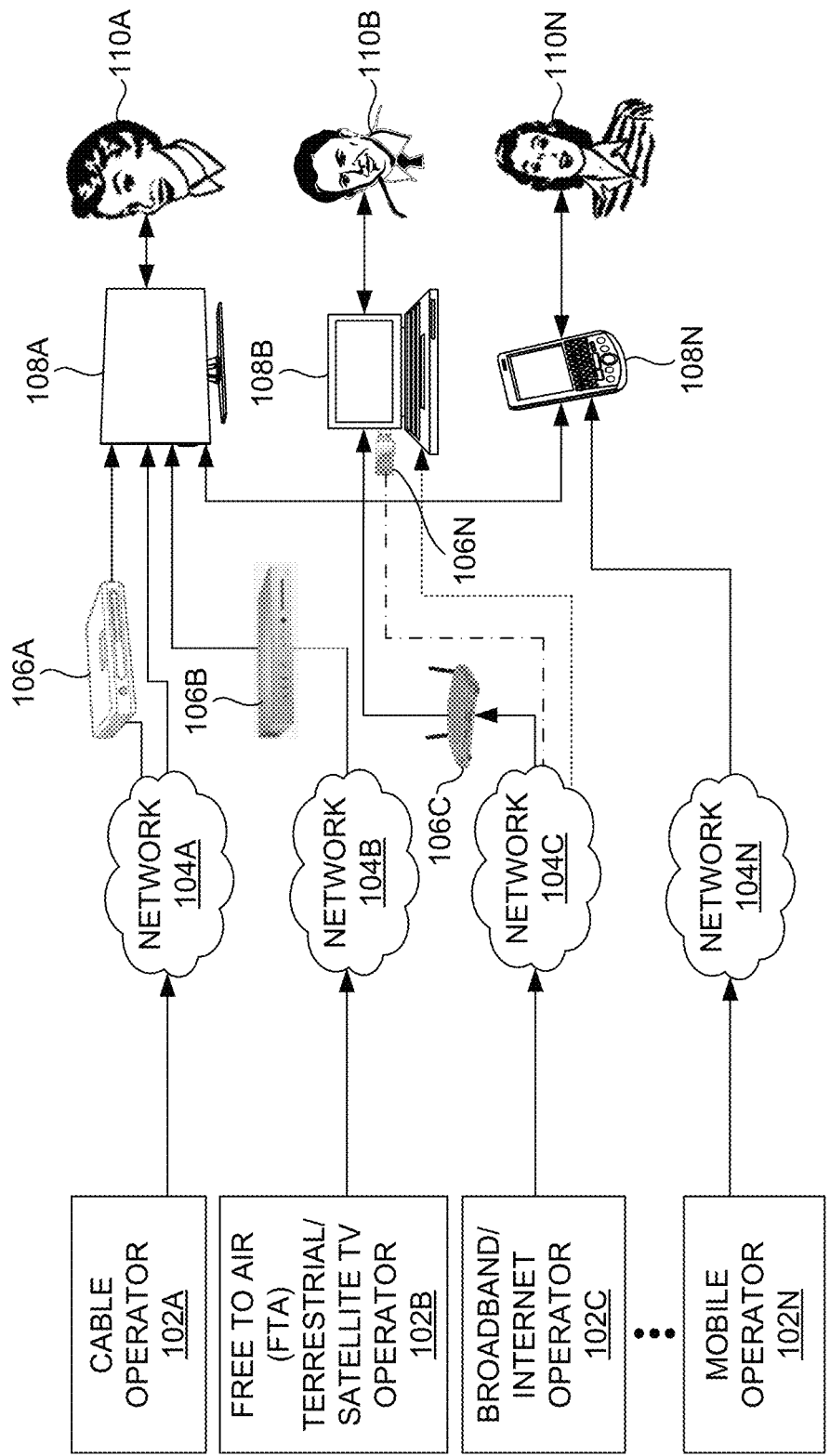
FIG. 1A illustrates a typical distribution of one or more services to one or more user devices associated with one or more users from one or more service operators via one or more networks.
Figure 1B:
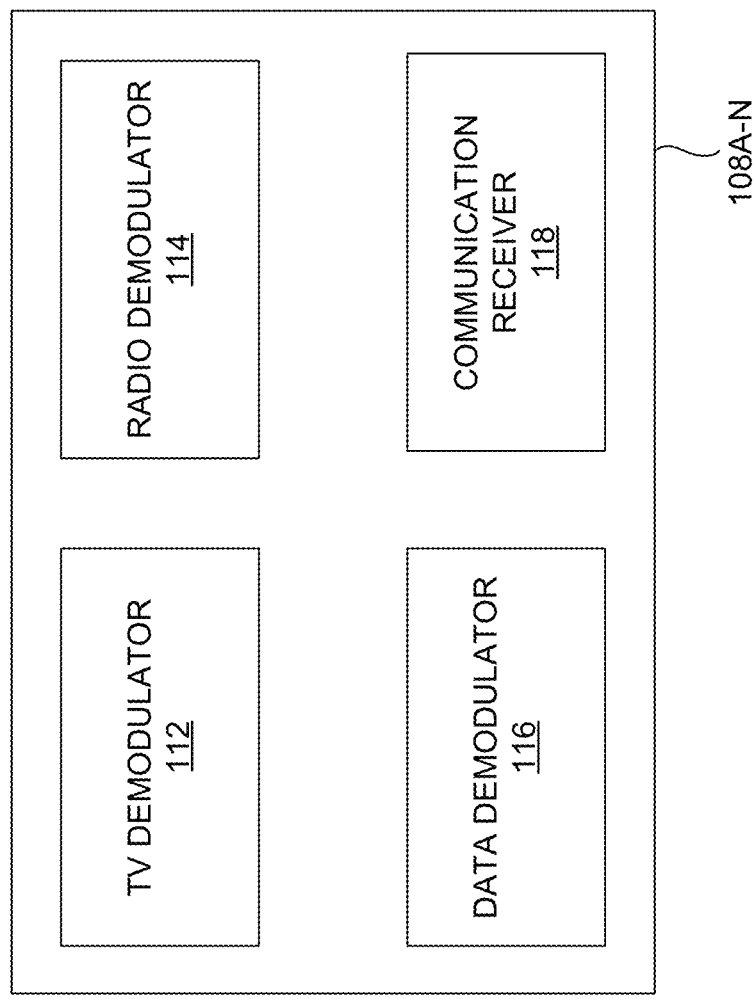
FIG. 1B illustrates the user device of FIG. 1A that includes more than one hardwired chipset.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need to strike a balance between functionality, and cost without compromising on the quality of service. The embodiments herein achieve this by providing a programmable transceiver (e.g., a programmable chipset) powered by Software Defined Radio (SDR) architecture. The programmable transceiver has a modem virtualiser software layer (something similar to a Java Virtual Machine (JVM) or Dalvik) that enables the programmable transceiver to manifest in different forms depending upon the firmware installed. One or more firmwares may be downloaded on to the user device either locally, remotely or from a portal server, and used as a service. The firmwares are independent of the underlying hardware enabling communication modem functionality and broadcast reception capability. The one or more firmwares may be selected and downloaded based on a device function type, service type, and cost function type (e.g., reliability, performance, quality, etc.). Referring now to the drawings, and more particularly to FIGS. 2 through 11, where similar reference characters denote corresponding features consistently throughout the figures, there are shown preferred embodiments.

Figure 2:
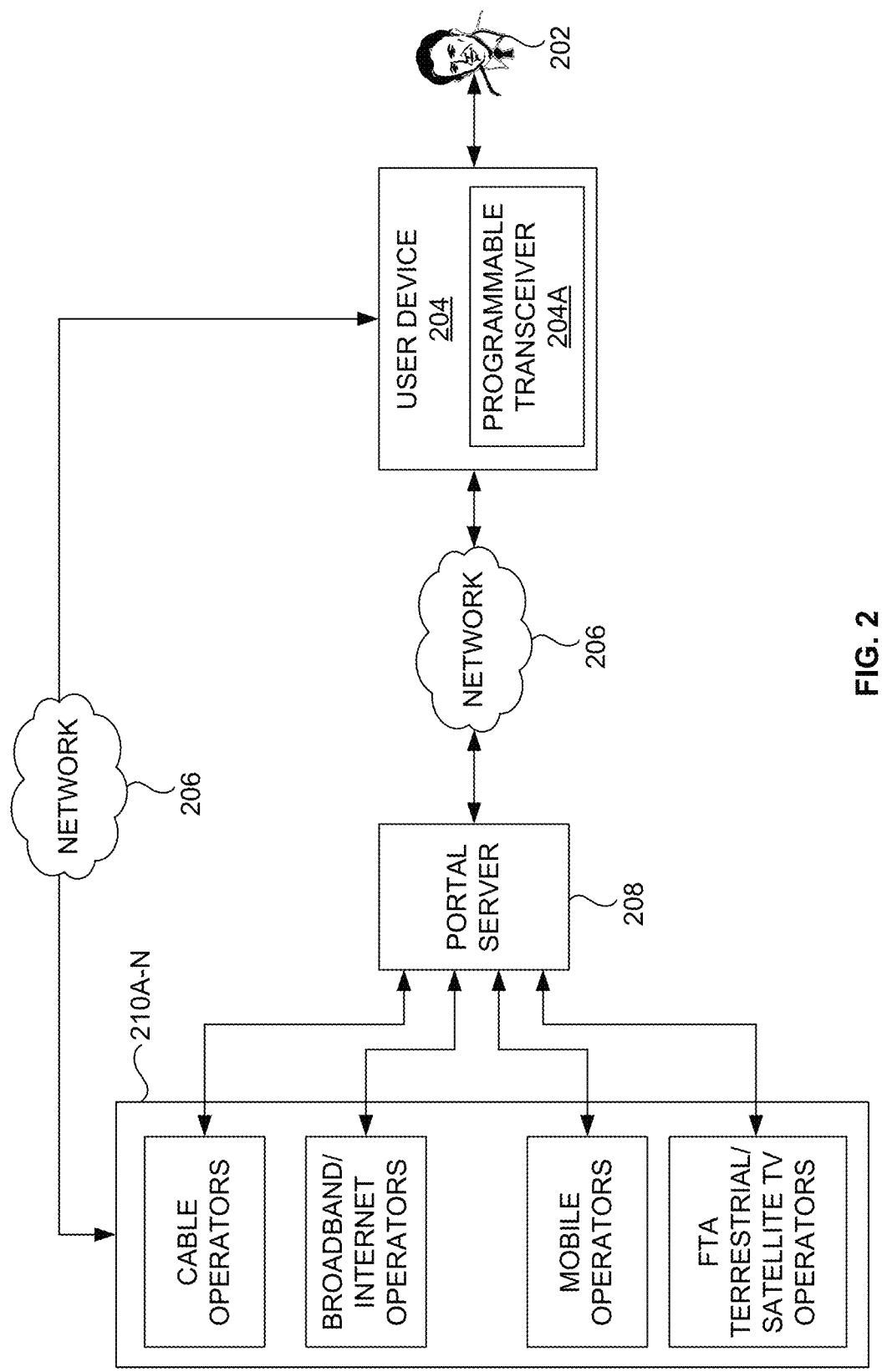
FIG. 2 illustrates a system view of a user communicating with a portal server through a user device via a network for downloading one or more firmwares to be used as a services provided by one or more service operators according to an embodiment herein.

FIG. 2 illustrates a system view of a user 202 communicating with a portal server 208 through a user device 204 via a network 206 for downloading one or more firmwares to be used as a service provided by one or more service operators 210A-N according to an embodiment herein. The user device 204 includes a programmable transceiver 204A (e.g., general purpose hardware or a generic processor). The programmable transceiver 204A is a programmable chipset (e.g., general purpose hardware or a generic processor or a Field-programmable gate array (FPGA)), in one example embodiment. The user 202 can download one or more firmware from the portal server 208 on to the user device 204. In one embodiment, the user device 204 is at least one of a Television, a personal computer (PC) or a laptop, a personal digital assistant (PDA), a mobile communication device, a set-top-box, home gateways, or any of such computing device/receiver that has the capability of (i) downloading an appropriate firmware, (ii) installing the appropriate firmware, and (iii) using the one or more services (or functionalities) through the firmware, etc.

For instance, the user device 204 may include a modem virtualiser software layer (e.g., Java Virtual Machine or a Dalvik). The Java virtual machine (JVM) is a virtual machine that can execute Java bytecode. It is the code execution component of the Java software platform. Dalvik is a process virtual machine (VM) in an operating system (e.g., Google's Android operating system). Dalvik is software that runs the applications on Android devices. These virtualiser software layers allow modem/demodulator firmware to be independent of the underlying hardware enabling communication modem functionality and broadcast reception capability.

The one or more firmwares are hosted on the portal server 208. In one embodiment, the one or more firmwares may be hosted on a third party server. Depending upon (i) payload (Video/Audio/Data), (ii) service rendered, and (iii) cost function (or optimization criterion), the user 202 can pay per usage or per view. In one embodiment, the services may be available for free, based on the cost functions and the type of payload. The one or more service operators 210A-N may be one or more cable operators, one or more broadband/internet operators, one or more mobile operators, and/or one or more FTA terrestrial/satellite TV operators, etc.

Figure 3:
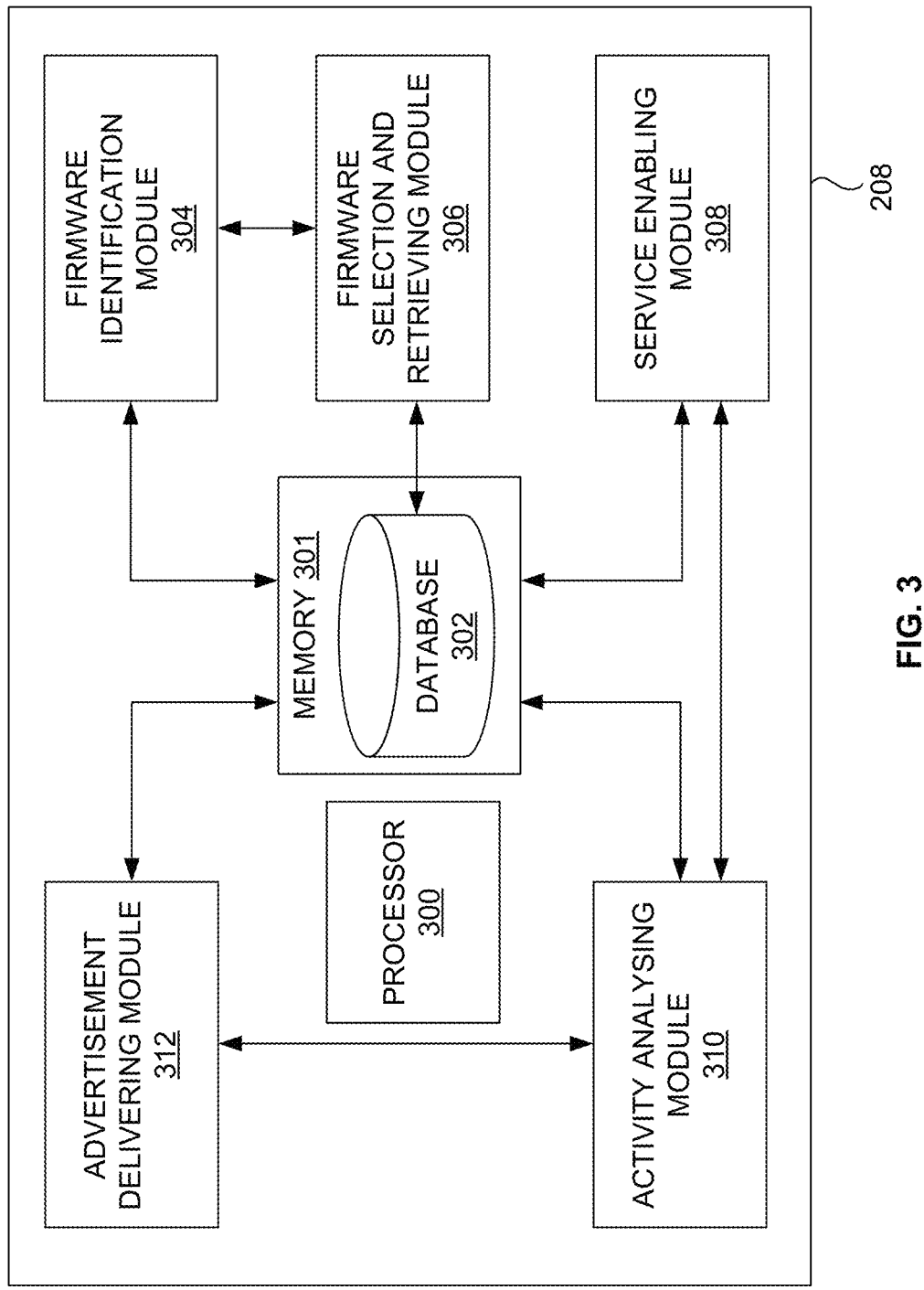
FIG. 3 illustrates an exploded view of the portal server of FIG. 2 according to an embodiment herein.

FIG. 3 illustrates an exploded view of the portal server 208 of FIG. 2 according to an embodiment herein. The portal server 208 includes a processor 300, a memory 301 storing a database 302, a firmware identifier module 304, a firmware selection and retrieving module 306, a service enabling module 308, an activity analysing module 310, and an advertisement delivering module 312. The database 302 stores one or more firmware associated with each service type, one or more keys associated with each of a firmware and a service type, one or more user profiles, and/or one or more user device specifications, etc. The database 302 further stores instructions to configure the processor 300. The firmware identifier module 304 identifies at least one firmware that corresponds to one or more inputs processed by the portal server 208. In one embodiment, the one or more inputs may include a selection of (i) a device function type, (ii) a service type, and/or (iii) a cost function type.

The firmware selection and retrieving module 306 selects the at least one firmware and retrieves it from the database 302. In one embodiment, the portal server 208 enables a downloadable link (e.g., click here to download the firmware) when the at least one firmware is retrieved. The user may then click on the downloadable link to download the firmware on to his/her device. The service enabling module 308 enables one or more services associated with the firmware that is downloaded on to the device. In one embodiment, the service enabling module 308 enables the service through one or more keys stored on the database 302. It is to be understood to a person having ordinary skill in the art that one or more existing service enabling techniques may be implemented to enable the services through one or more keys stored on the database 302. One or more keys are referred as one or more service enabling instructions, in one example embodiment. Each of the one or more service enabling instruction set is specific to at least one firmware.

When the firmware is installed on the device, the portal server 208 activates the one or more keys that correspond to the firmware, and the one or more services. The user is then able to use the one or more services when the one or more keys are activated by the service enabling module 308. In one embodiment, the one or more firmware's monitors one or more activities of the user associated with the one or more services. The one or more activities may include user interactions with a payload (e.g., an audio content, a video content, and/or a voice data, etc.

The one or more activities performed by the user are notified to the activity analysing module 310. In one embodiment, the one or more firmware transmits the details of the activities to the activity analyzing module 310. The activity analysing module 310 analyses the one or more activities based on the user interactions with the one or more services and the payload. The activity analyzing module 310 performs analytics on the one or more activities and communicates to the one or more service operators 210A-N (also referred as one or more service providers), and the user 202. The analytics include the systematic computational analysis of data or statistics (e.g., user interaction with payload, one or more functionalities, and one or more services). The advertisement delivering module 312 delivers one or more targeted advertisements to the user devices based on the one or more activities and the analytics.

The service operators 210 may also directly communicate with the user 202 and offer one or more services (e.g., add on packages, discounts, and/or value added services, or free services for a certain time period), etc. The portal server 208 may activate these services (which are communicated to the user based on the analytics) with or without a consultation or a confirmation from the user 202. In other words, the services and functionalities are activated and enabled with or without an input (e.g., a Yes or No confirmation) from the user 202. For example a service and functionality may be activated when (i) a message is communicated on the user device 204, and (ii) in response to the message, the user 202 provides an input (e.g., a confirmation message to activate and enable) to that particular service or functionality. These services and functionality(s) may be activated and enabled on the user device 204 without the user 202 having to download and execute corresponding firmwares on the user device 204.

The processor 302 processes a first device function type, a first service type, and a first cost function from a communication device (e.g., a mobile phone or the user device 204). The communication device includes a hardware component (e.g., a Subscriber identity module (SIM)) that is specific to a first service provider (e.g., a first mobile operator). The firmware identification module 304, when executed by the processor 302, identifies a first firmware that is configured to be executed on the communication device. The firmware selection and retrieving module 306 when executed by the processor 300 is configured to retrieve the first firmware from the database 302 and communicate the first firmware to the communication device.

The service enabling module when executed by the processor 300 activates a first set of service enabling instructions to enable a first service (e.g., a SMS service) and a first functionality (e.g., text messaging) associated with the first firmware when the first firmware is executed on the communication device. The processor is further configured by the instructions to: process a second device function type, a second service type, and a second cost function from the communication device. The firmware identification module 304, when executed by the processor 300, further identifies a second firmware that is configured to be executed on the communication device based on the second device function type, the second service type, and the second cost function.

The firmware selection and retrieving module 306, when executed by the processor 300, further retrieves the second firmware from the database 302 and communicates the second firmware to the communication device. The service enabling module 308, when executed by the processor 300, further activates a second set of service enabling instructions to enable a second service (e.g., a call service) and a second functionality (e.g., local call or international call) associated with the second firmware when the second firmware is executed on the communication device. The second service and the second functionality associated with the second firmware specific to a second service provider (e.g., a second mobile operator who is different from the first mobile operator), are enabled for the same hardware component (e.g., for the same SIM). For example, the first mobile operator may be Vodafone Group plc, and the second mobile operator may be Bharti Airtel Limited.

Figure 4A:
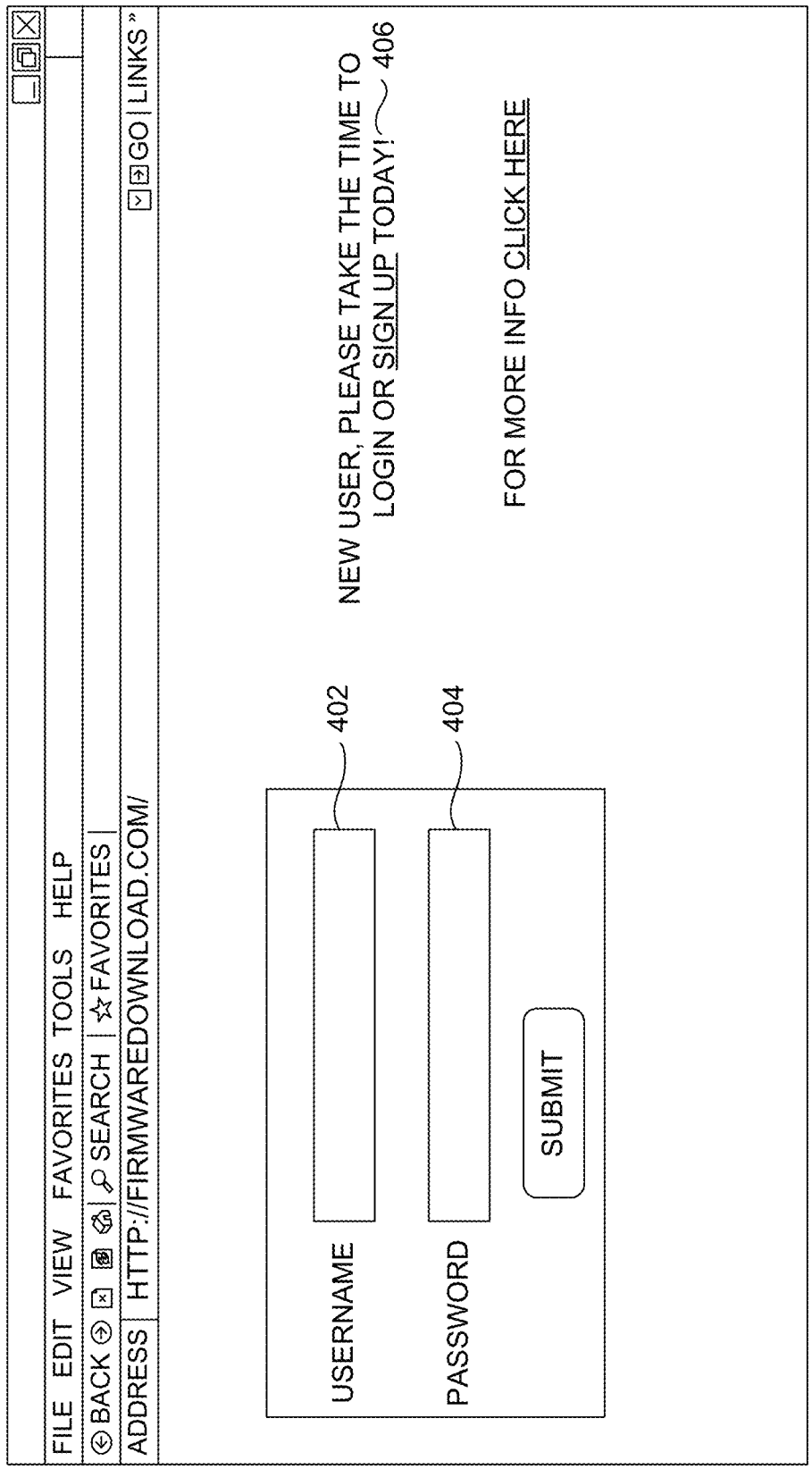
FIG. 4A illustrates a user interface view of the portal server of FIG. 2 according to an embodiment herein.

FIG. 4A illustrates a user interface view of the portal server 208 of FIG. 2 according to an embodiment herein. The portal server 208 includes a login interface that includes a username field 402, a password field 404, and a sign up option 406 for registering new users. The username field 402 and the password field 404 enable the user 202 to (i) login into the portal server 208 and (ii) download an appropriate firmware for using the one or more services.

Figure 4B:
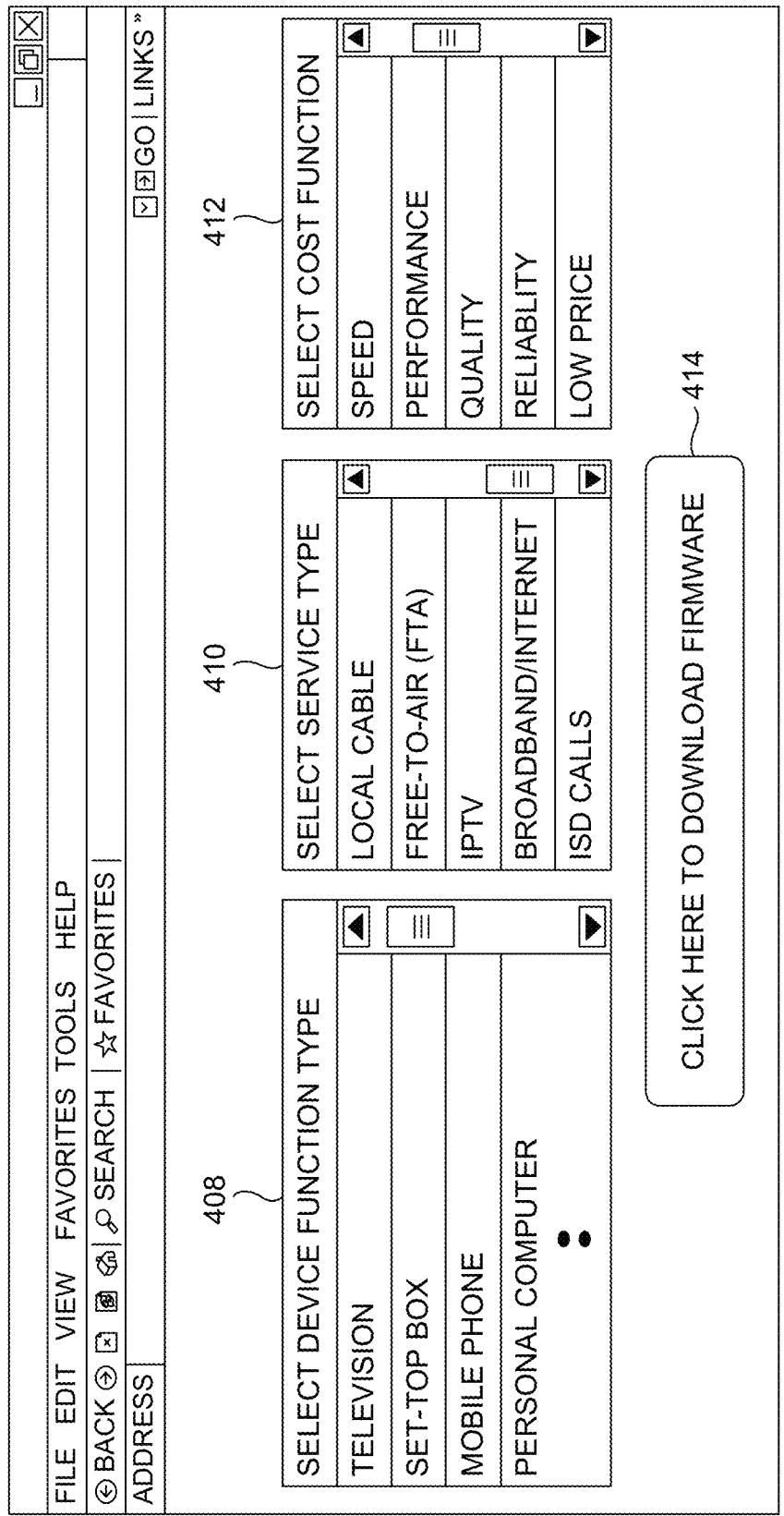
FIG. 4B illustrates a user interface view of the portal server of FIG. 2 according to an embodiment herein.

With reference to FIG. 4A, FIG. 4B illustrates a user interface view of the portal server 208 of FIG. 2 according to an embodiment herein. The portal server 208 includes a user interface that includes a select a device function type field 408, a select a service type field 410, a select a cost function type 412, and a click here to download a firmware field 414. The select a device function type field 408 allows one or more users (e.g., the user 202) to select his/her device to function as a television, a set top box, a mobile phone, and/or internet radio, etc. The select a service type field 410 allows the one or more users 202 to select type of service (e.g., a local cable service, a Free-To-Air Terrestrial or Satellite Service known as Direct to Home (DTH) service, an IPTV service, a broadband/internet service, and/or an ISD calls service, etc. The DTH is a service where a satellite is used for transmission TV/radio signals either as a free service or a paid service. The select a cost function type field 412 allows the one or more users 202 to select type of cost function (e.g., speed, performance, quality, reliability, and/or low price). In one embodiment, the one or more users 202 may also select more than one cost function for downloading an appropriate firmware. The click here to download a firmware field 414 allows the one or more users 202 to download one or more firmware when the one or more users 202 select at least one (i) device function type, (ii) service type, and (iii) cost function.

In the embodiment, the one or more users 202 may opt for a particular firmware on the portal server 208, the portal server 208 may either provide the requested firmware or display an external link for downloading the particular firmware. Clicking on the external link provided by the portal server 208, the one or more users 202 may be redirected to a third party server (e.g., hosted by a Service Provider) with the authorization to download the particular firmware enabling the users 202 to use the function or a feature as a service. One or more keys for enabling this particular firmware to be used as a service may be stored either on the database 302 of the portal server 208 or on the third party server, in one example embodiment.

The user interface may further include a location field (not shown in FIG. 4B) that allows the user 202 to select a location (e.g., MG Road, Bangalore, India) for using the one or more services. The user interface may further include a device identifier (ID) field (not shown in FIG. 4B) that allows the user 202 to select a device identifier (ID) associated with a device type. For example, XYZ mobile communication device may be selected as the device type, for which the device ID type can be selected as X01. Based on these inputs, an appropriate firmware may be downloaded on the user device 204 and be used as a service (e.g., a DTH service). For example, the user 202 may provide his/her inputs such as (i) a device type (e.g., XYZ mobile communication device), (ii) a device identifier type (e.g., X01), (ii) a device function type (e.g., television), (iii) a service type (e.g., DTH service), (iv) a cost function (e.g., quality), a location (e.g., MG Road, Bangalore, India) or (v) combinations thereof, into the portal server 208. The user 202 provides at least one input (e.g., the device function type), in one example embodiment. Based on the one or more inputs, an appropriate firmware may be downloaded onto the user device 204 and be used as a service (e.g., the DTH service).

Figure 5A:
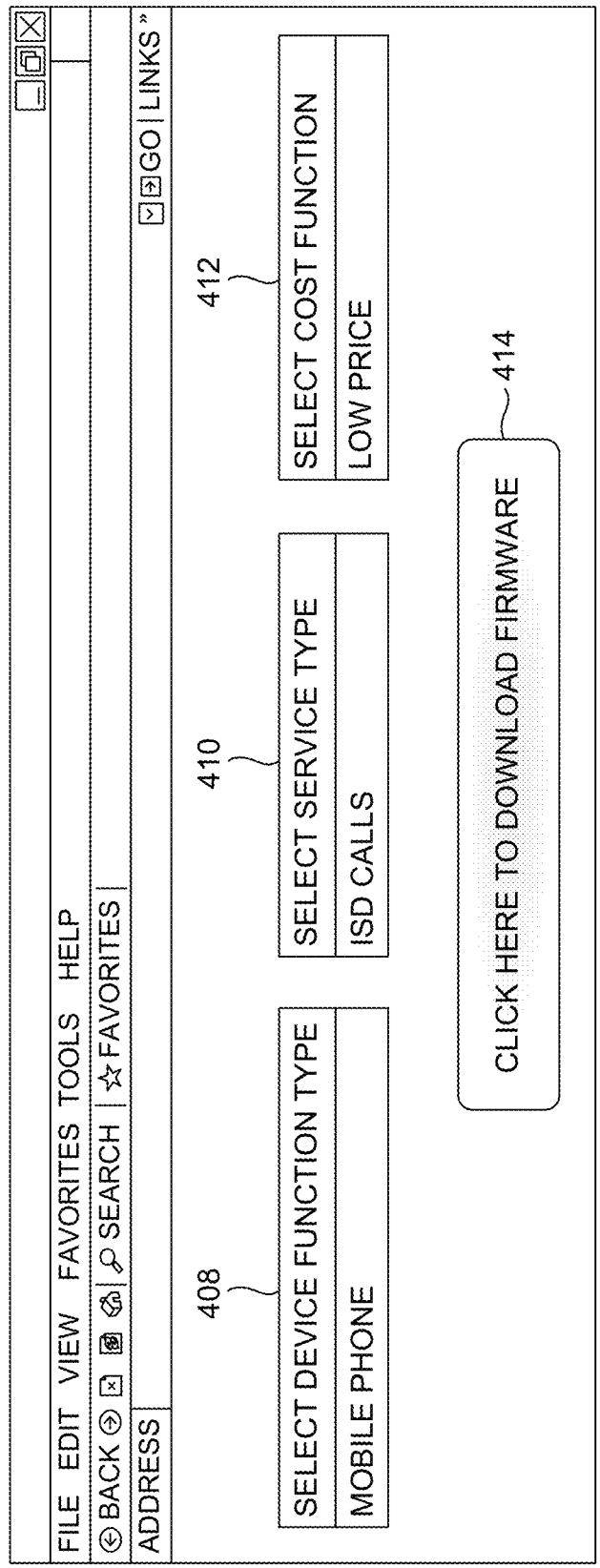
FIG. 5A illustrates a user interface view of the portal server of FIG. 2 for downloading a firmware to be used as a voice service in a mobile communication device according to an embodiment herein.

With reference to FIG. 4B, FIG. 5A illustrates a user interface view of the portal server 208 of FIG. 2 according to an embodiment herein. In particular, FIG. 5A illustrates a user interface view of the portal server 208 of FIG. 2 for downloading a firmware to be used as a voice service in a television according to an embodiment herein. The portal server 208 includes a user interface that includes the select a device function type field 408, the select a service type field 410, the select a cost function field 412, and the click here to download a firmware field 414. As shown in FIG. 5A, the user 202 may select (i) mobile communication device as his/her device function type, (ii) ISD calls as a required service type, and (iii) low price as a cost function. The user device 204 associated with the user 202 may be a television which can function as a mobile communication device by downloading an appropriate firmware on to the television. Based on these inputs provided by the user 202, the portal server 208 identifies an appropriate firmware (using the firmware identifier module 304) that corresponds to the inputs. This firmware is retrieved from the database 302 (using the firmware selection and retrieving module 306 of FIG. 3) and is provided to the user 202 via a downloadable link (using the click here to download a firmware field 414). The user 202 downloads onto his/her user device (e.g., the television) for corresponding services (e.g., to initiate ISD Calls).

The portal server 208 may be operated by a third party service operator, in one example embodiment. The third party service operator aggregates a list of service operators who provide one or more services. Based on the one or more inputs (e.g., (i) mobile communication device as his/her device function type, (ii) ISD calls as a required service type, and (iii) low price as a cost function) from the user 202, the third party service operator may retrieve at least one firmware (from the database 302) that corresponds to at least one service and is specific to at least one service operator. The at least one firmware is provided to the user 202 via a downloadable link (using the click here to download a firmware field 414). The at least one service that corresponds to the at least one service operator may be based on (i) a real time bid (dynamic bidding) for offering services to one or more users, or (ii) a bid/auction that has previously occurred for one or more services. One or more service operators may bid to provide one or more services to one or more users based on the one or more inputs received from one or more users.

Figure 5B:
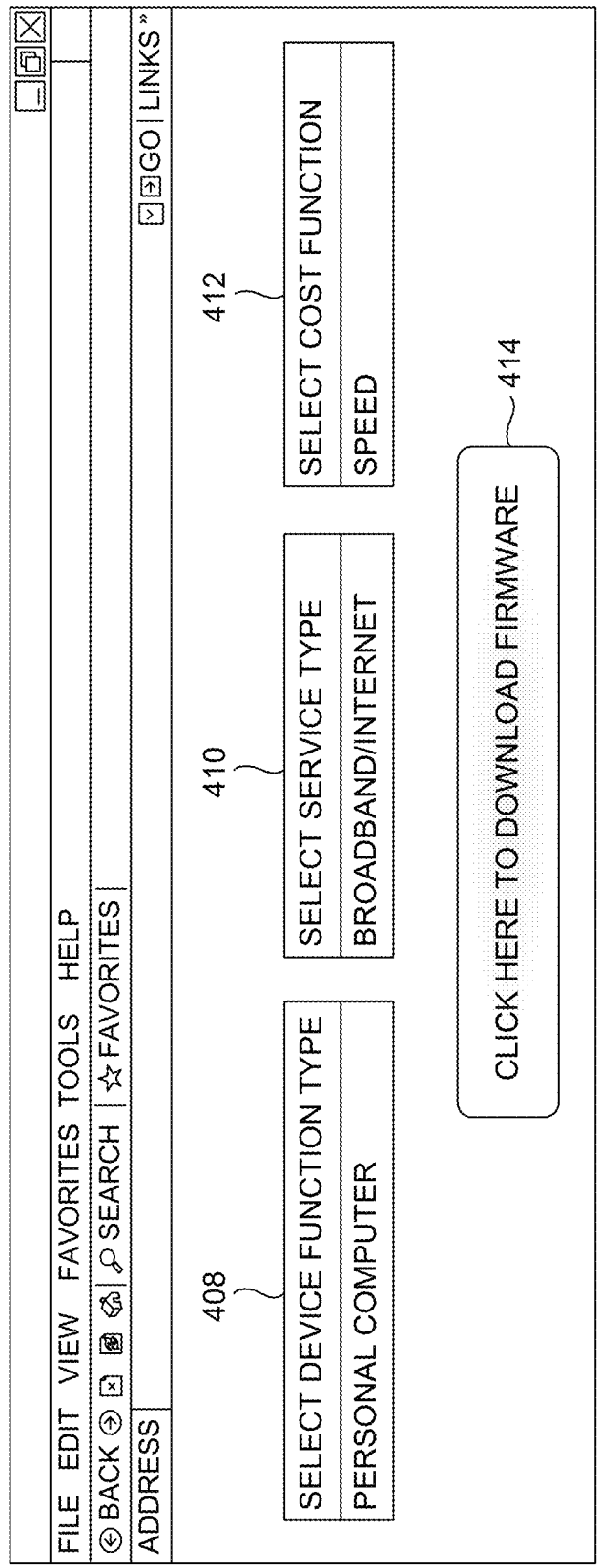
FIG. 5B illustrates a user interface view of the portal server of FIG. 2 for downloading a firmware to be used as a broadband/internet service in a personal computer according to an embodiment herein.

With reference to FIG. 4B and FIG. 5A, FIG. 5B illustrates a user interface view of the portal server 208 of FIG. 2 according to an embodiment herein. In particular, FIG. 5B illustrates a user interface view of the portal server 208 of FIG. 2 for downloading a firmware to be used as a broadband/internet service in a television set top box. The user 202 may select (i) modem as his/her device function type, (ii) broadband/internet as a required service type, and (iii) speed as cost function. Based on these inputs provided by the user, the portal server 208 identifies an appropriate firmware (using the firmware identifier module 304) that corresponds to these inputs (e.g., personal computer, broadband/internet, and/or speed). This firmware is retrieved from the database 302 (using the firmware selection and retrieving module 306 of FIG. 3) and is provided to the user 202 via a downloadable link (using the click here to download a firmware field 414). The user 202 downloads onto his/her user device (e.g., the television set top box) and uses corresponding services (e.g., broadband/internet services).

Figure 5C:
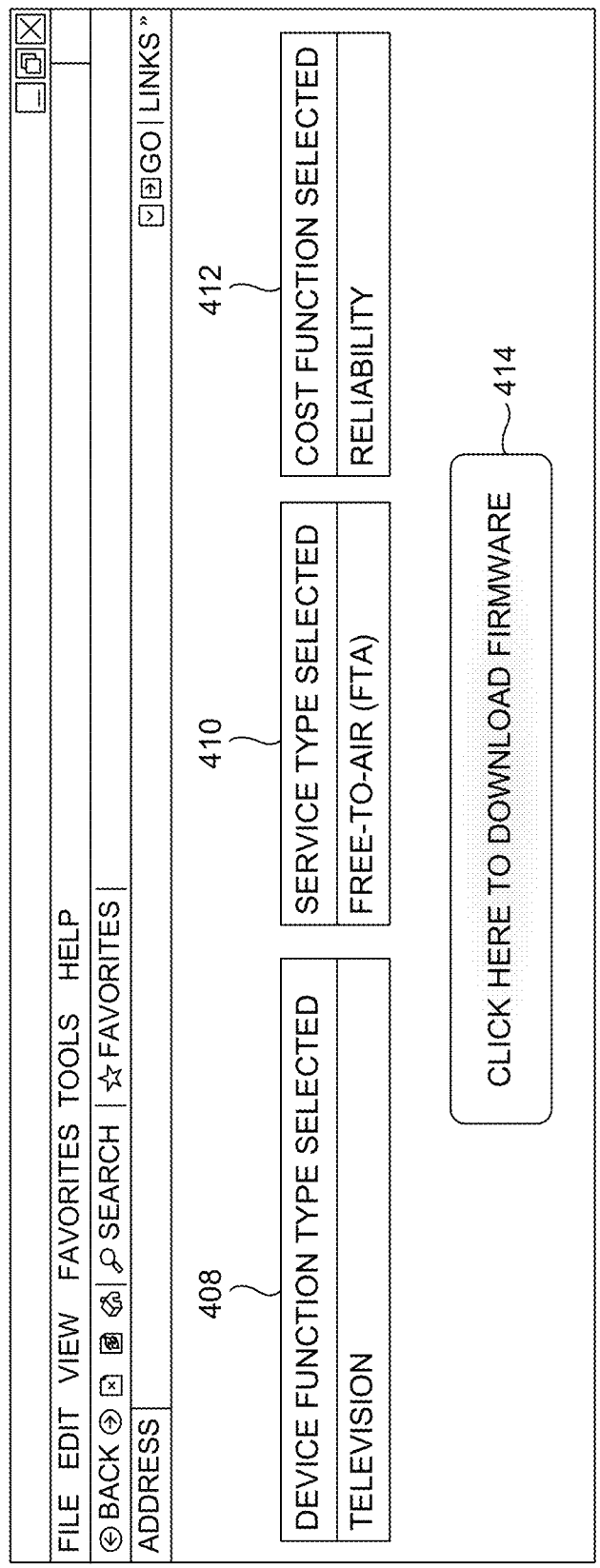
FIG. 5C illustrates a user interface view of the portal server of FIG. 2 for downloading a firmware to be used as a Free-to-Air service in a television or set top box according to an embodiment herein.

With reference to FIG. 4B through FIG. 5B, FIG. 5C illustrates a user interface view of the portal server 208 of FIG. 2 according to an embodiment herein. In particular, FIG. 5C illustrates a user interface view of the portal server 208 of FIG. 2 for downloading a firmware to be used as a Free-to-Air (FTA) service in a mobile communication device according to an embodiment herein. The user 202 may select (i) television or set top box as his/her device function type, (ii) FTA as a required service type, and (iii) reliability as a cost function. Based on these inputs provided by the user 202, the portal server 208 identifies an appropriate firmware (using the firmware identifier module 304) that corresponds to these inputs. This firmware is retrieved from the database 302 (using the firmware selection and retrieving module 306 of FIG. 3) and is provided to the user 202 via a downloadable link (using the click here to download a firmware field). The user 202 downloads the firmware onto his/her user device (e.g., the mobile communication device) and uses corresponding services (e.g., FTA services). In one embodiment, the user 202 can select multiple cost functions. An appropriate firmware is retrieved from the database 302 based on the multiple cost functions.

Figure 6C:
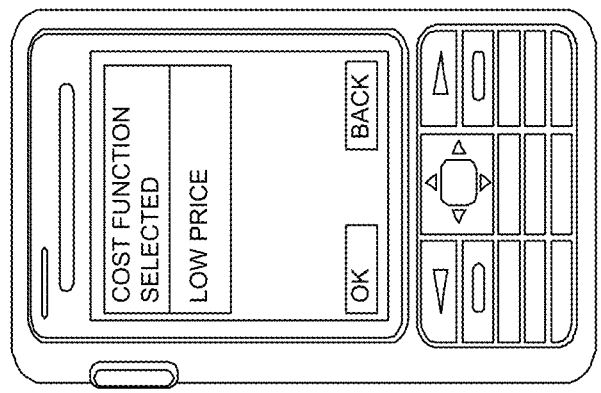
FIG. 6A through FIG. 6E is an exemplary view illustrating a method of using a mobile communication device to function as a television according to an embodiment herein.
Figure 6B:
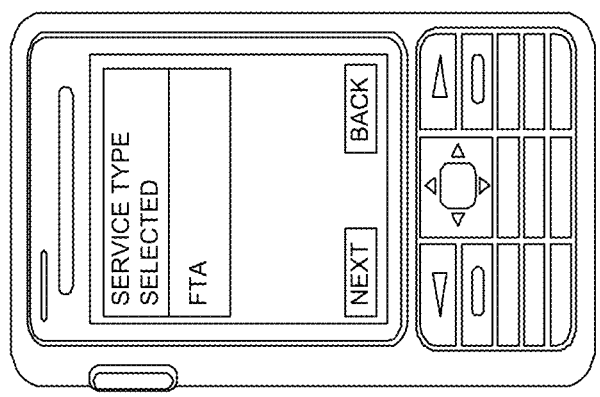
Figure 6A:
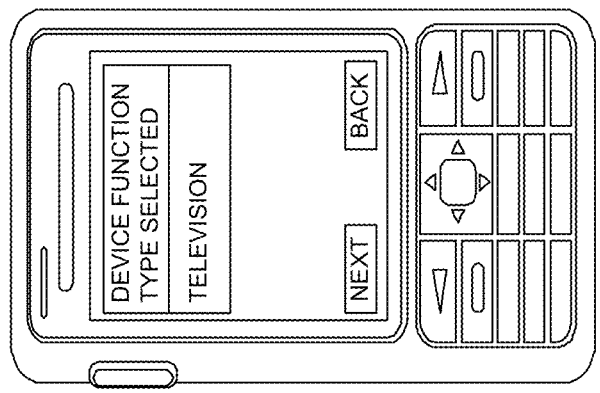
Figure 6E:
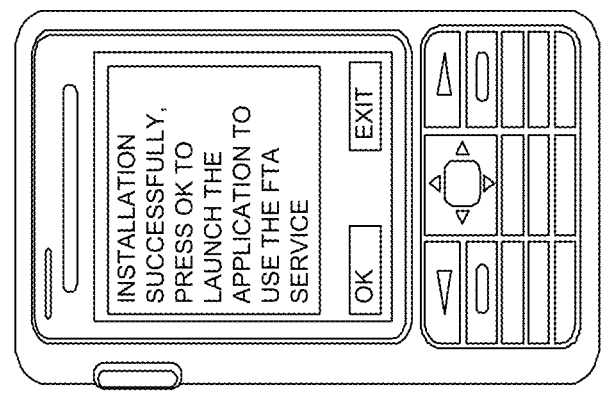
Figure 6D:
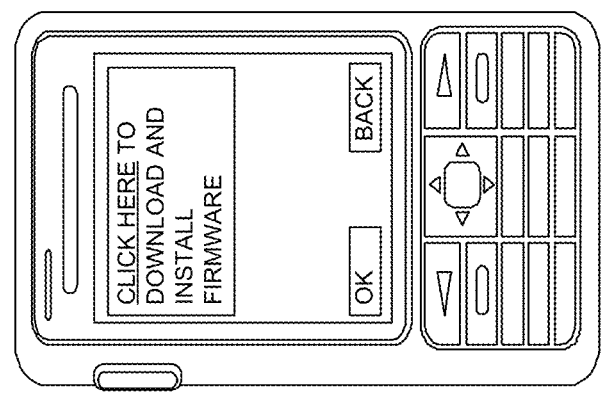
Figure 8:
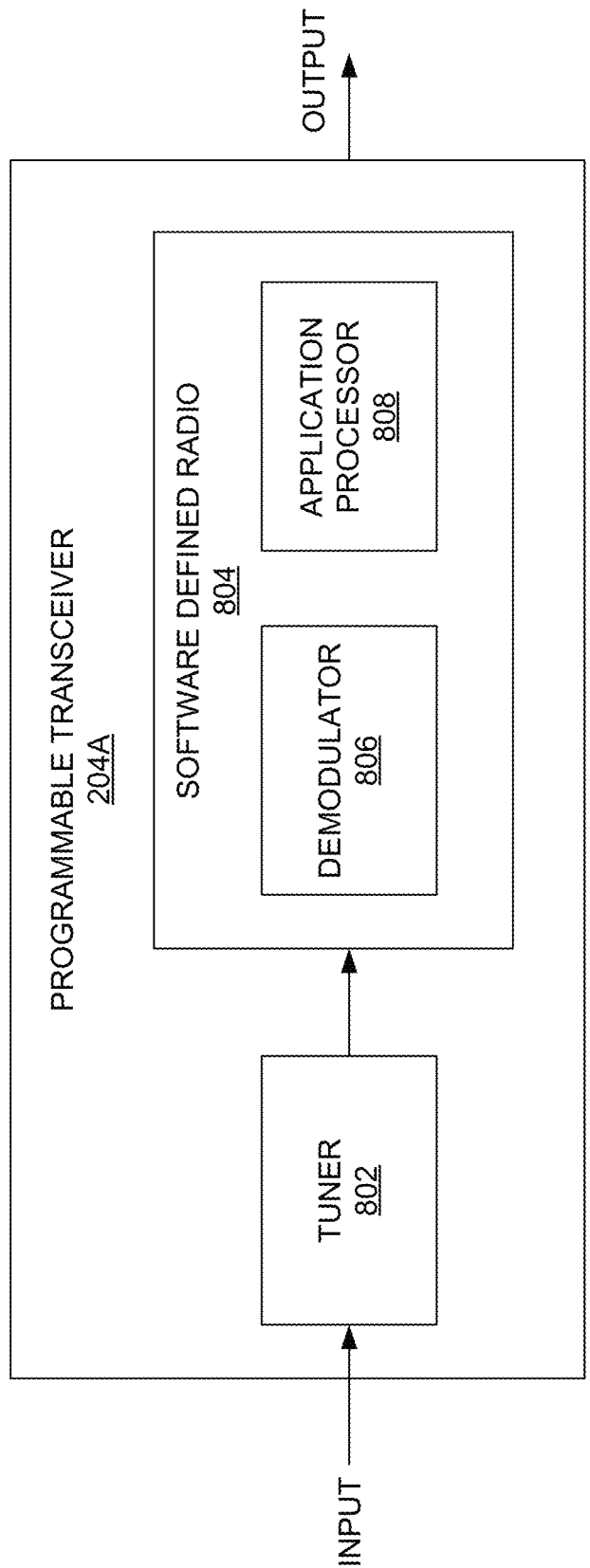
FIG. 8 illustrates an exploded view of the programmable transceiver of the user device of FIG. 2 according to an embodiment herein.
Figure 9:
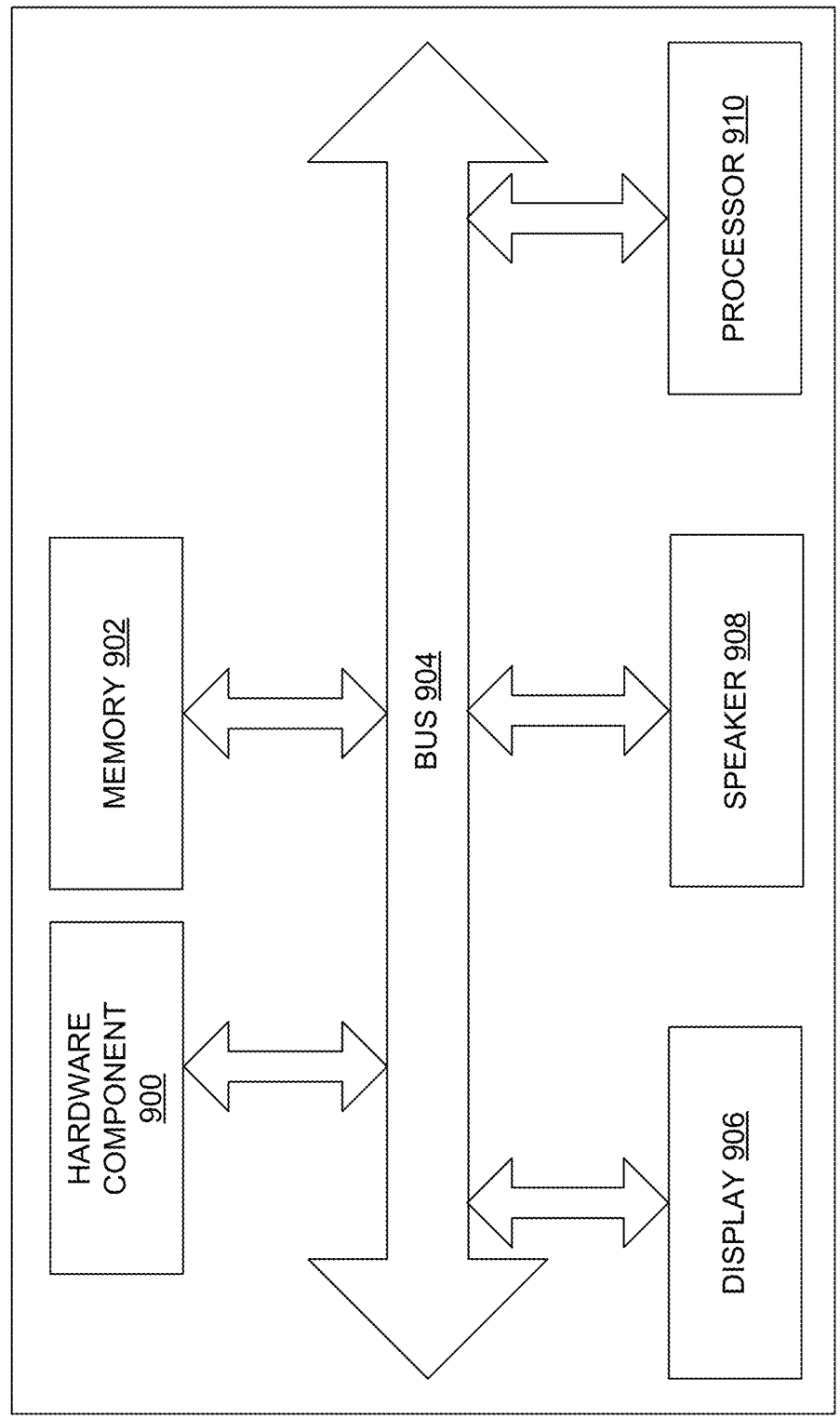
FIG. 9 illustrates a schematic diagram of the user device of FIG. 2 according to an embodiment herein.

FIG. 6A through FIG. 6E is an exemplary view illustrating a method of using a mobile communication device to function as a television according to an embodiment herein. As shown in FIG. 6A-6C, the user can login to the portal server 208 to download appropriate firmware. The mobile communication device may include a client application software that allows a user to select (i) a device function type (e.g., to function as a television), (ii) a service type (e.g., FTA service), and a cost function type (e.g., low price), in one example embodiment. Upon submitting (i) the device function type (e.g., to function as a television), (ii) the service type (e.g., the FTA service), and the cost function type (e.g., low price), a new user interface is displayed to the user that provides an indication to click on a URL to download and install the firmware as shown in FIG. 6D. Upon installation of the firmware on the mobile communication device, the user 202 may be prompted to launch the application to use the FTA service as shown in FIG. 6E. Similarly, by using the same mobile communication device, the user 202 can use other functionalities and services (e.g., FM radio, internet radio, and broadband/internet) from different service operators.

FIG. 7 illustrates a table view of the activity analysing module 310 of the portal server 208 of FIG. 2 according to an embodiment herein. The table view includes a user field 702, a device type field 704, a device function type field 706, a service used field 708, a service operator used field 710, a frequency of services used field 712, a cost function preferences field 714, a payload accessed field 716. The user field 702 includes the user 202 who have downloaded the firmware to be used as the one or more services. The device type field 704 includes one or more user device types. The device function type field 706 includes a list of devices that were used to function as another device. For example, John Doe used his device set top box to function as a modem. The service used field 708 includes lists of services used by the user 202. The service operator used field 710 includes list of service operators opted by the user 202 for using the one or more services. The frequency of services used field 712 includes a list indicating a frequency of particular service used by the user 202. The cost function preferences field 714 includes a list of cost functions preferred by the user 202 for opting the one or more services. The payload accessed field 716 includes type of payload the user 202 has accessed using the one or more services.

For example, a user John Doe has a set top box and has used it to function as a modem for broadband/internet services from an internet service provider (e.g., ISP 1) for 2 times by selecting a cost function as low price. The payload accessed by John Doe is audio content while using this service. Similarly, John Doe has a mobile phone and used it as a modem for Wi-Fi and/or 3G services for 5 times. The cost function preference is speed. The payload accessed by John Doe is video content.

In another example, Marc has a television and used it to function as a mobile phone for voice services from a mobile operator (e.g., a mobile operator 1) for 3 times. The cost function preference is quality. The payload accessed by Marc is ISD calls. Similarly, Marc has a mobile phone and used it to function as television for used DTH services from a DTH operator (e.g., DTH operator 1) for 3 times. The cost function is low price. The payload accessed by Marc is a sports channel. Similarly, Marc has used add-on package services from another DTH operator (e.g., DTH operator 2 that is different from the DTH operator 1) for 4 times by selecting a cost function as quality. The payload accessed by Marc is one or more reality shows.

The activities performed by users (John Doe, and Marc) on the services are monitored by corresponding firmware on the user device 204. The firmware transmits details of the activities to the activity analysing module 310. Based on the activities performed by the users (e.g., John Doe and Marc), the advertisement delivering module 312 delivers targeted advertisements to the user device 204. For example, John Doe has accessed audio and video payloads. The advertisement delivering module 312 may deliver one or more targeted advertisements related to the audio and video payloads. For example, the advertisements may include (i) "download and listen to millions of pop music for free" from www.abcdownload.com, (ii) "download or watch high definition videos at www.hdvideos.com", etc.

Similarly, Marc has viewed sports channel, and reality shows. The advertisement delivering module 312 may deliver one or more targeted advertisements related to the sports channel, and reality shows. In one embodiment, the advertisements may be delivered on a television display while Marc is viewing a television program. For example, the targeted advertisements may include (i) subscribe to entertainment add on package with 20% discount", (ii) subscribe to movies add on package for 3 months, and get additional one month for free", etc. In one embodiment, the users (John Doe and Marc) may be either charged per view/usage for the service, or the payload may be made available for free. The advertisements may be delivered to the user device 204 via a SMS channel, a MMS channel, or any other communication channels.

In one embodiment, the advertisements delivered to the user device 204 may be associated with different service operators. For example, if Marc has used DTH operator 1 for sports channels as a service, and DTH operator 2 for reality shows, then the advertisement delivery module 312 may either (i) deliver advertisements for various services that are associated with the same operators (e.g., the DTH operator 1 and the DTH operator 2), or (ii) deliver advertisements for various services that are associated with the other operators (e.g., a DTH operator 3, a DTH operator 4, etc.) that are different from the DTH operator 1 and the DTH operator 2. As discussed in the above examples, the advertisements (i) subscribe to entertainment add on package with 20% discount", (ii) subscribe to movies add on package for 3 months, and get additional one month for free", may be related to the DTH operator 3, and the DTH operator 4). Similarly, the advertisement delivery module 312 may deliver targeted advertisements related to other services (e.g., broadband/internet services, mobile network services) to the user 202 on the user device 204. This provides the user 202 the flexibility to use various services (i) without having to be dependent on one service provider, and (ii) without having to change user device (e.g., changing a set top box for using other service provider, or changing a mobile communication device to use other functionalities).

Further, the advertisement delivering module 312 may deliver targeted advertisements in real time based on the current activities performed by the user 202 while using the one or more services. The one or more firmwares installed on the user device 204 monitor the activities performed by the user 202 and transmit the details of the activities to the activity analysing module 310, in one example embodiment. The programmable transceiver 204A may monitor the activities performed by the user 202 and transmit the details of the activities to the activity analysing module 310, in another example embodiment. For example, if Marc is viewing cricket on a sports channel, one or more advertisements such as offers on add on package, and/or discounts on other channel subscriptions may be delivered to Marc on the television display instantaneously. These offers and/or discounts may be either related to the sports channel, or any other TV broadcasting channels. The advertisements may be delivered to the user device 204 using a push or pull service, in one example embodiment.

With reference to FIG. 2 through FIG. 7, FIG. 8 illustrates an exploded view of the programmable transceiver 204A of the user device 204 of FIG. 2 according to an embodiment herein. The programmable transceiver 204A includes a tuner 802, and a software defined radio (SDR) block 804. The software defined radio (SDR) block 804 includes a demodulator 806, and an application processor 808. The demodulator 806 demodulates one or more signals received from the tuner 802. The application processor 808 produces one or more output signals based on one or more demodulated signals received from the demodulator 806.

With reference to FIG. 2 through FIG. 8, FIG. 9 illustrates a schematic diagram of the user device 204 of FIG. 2 having an a memory 902 having a set of instructions, a bus 904, a display 906, a speaker 908, and a processor 910 capable of processing a set of instructions to perform any one or more of the methodologies herein, according to an embodiment herein. The user device 204 further includes a hardware component 900 that is specific to a service provider (or service operator). The hardware component 900 is selected from a group that includes a Subscriber identity module associated with a mobile service operator, an electronic component associated with a free to air service terrestrial or satellite service operator, an electronic component associated with an IPTV service operator, an electronic component associated with a local cable service operator, an electronic component associated with an internet service provider, etc.

The processor 910 is the same application processor, in one embodiment. The processor 910 may also enable digital content to be consumed in the form of video for output via one or more displays 906 or audio for output via speaker and/or earphones 908. The processor 910 may also carry out the methods described herein and in accordance with the embodiments herein.

Digital content may also be stored in the memory 902 for future processing or consumption. The memory 902 may also store program specific information and/or service information (PSI/SI), including information about digital content (e.g., the detected information bits) available in the future or stored from the past. The user of the user device 204 may view this stored information on the display 906 and select an item of for viewing, listening, or other uses via input, which may take the form of keypad, scroll, or other input device(s) or combinations thereof. The memory 902 includes a database (not shown in FIG. 9) that stores one or more firmwares each specific to a service provider, (ii) instructions to configure the processor 910. When digital content is selected, the processor 910 may pass information. The content and PSI/SI may be passed among functions within the receiver using the bus 904.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
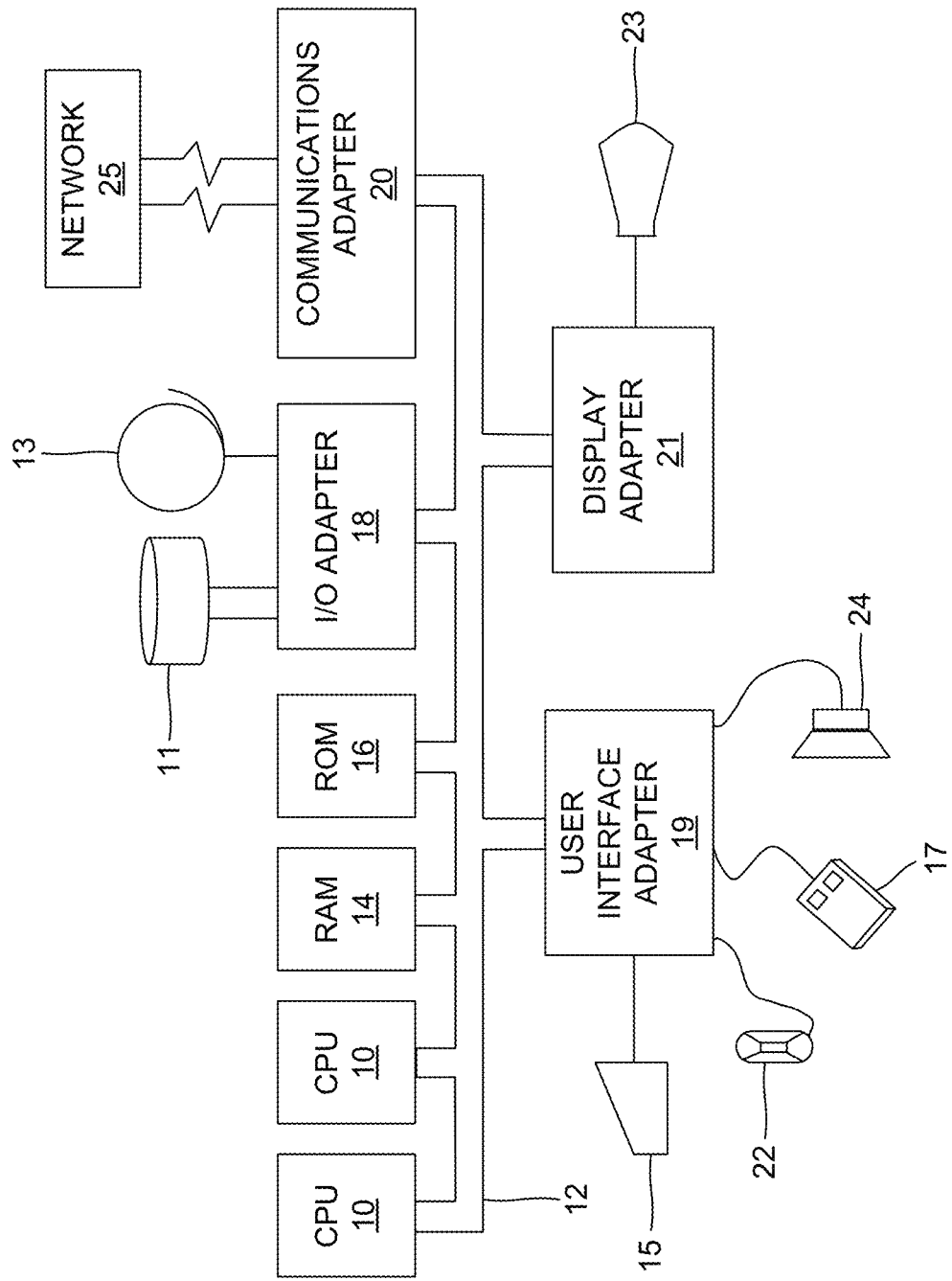
FIG. 10 illustrates a schematic diagram of a computer architecture used in accordance with the embodiments herein.

A representative hardware environment for practicing the embodiments herein is depicted in FIG. 10. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 11:
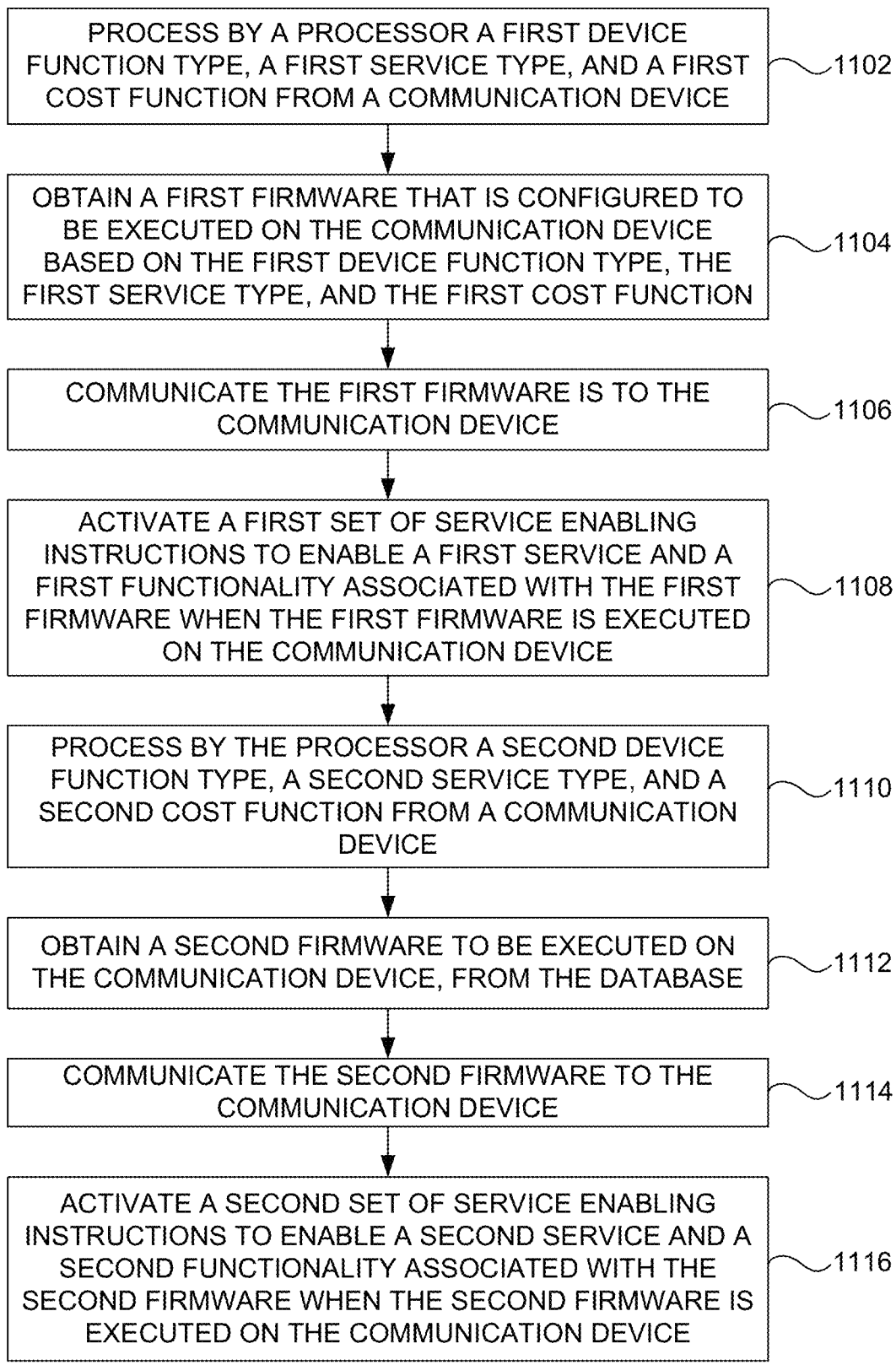
FIG. 11 is a flow diagram illustrating a method performing services and functionalities across device types and service providers within the user device 204 using the portal server 208 according to an embodiment herein.

FIG. 11, with reference to FIGS. 1 through 10, is a flow diagram illustrating a method performing services and functionalities across device types and service providers within the user device 204 using the portal server 208 according to an embodiment herein. In step 1102, a first device function type, a first service type, and a first cost function are processed by the processor 300 from the communication device 204. The communication device 204 includes a hardware component (e.g., the SIM) that is specific to a first service provider. In step 1104, a first firmware that is configured to be executed on the communication device is obtained from the database 302 based on the first device function type, the first service type, and the first cost function. In step 1106, the first firmware is communicated to the communication device. In step 1108, a first set of service enabling instructions are activated (using the service enabling module 308) to enable a first service and a first functionality associated with the first firmware when the first firmware is executed on the communication device. In step 1110, a second device function type, a second service type, and a second cost function from the communication device may be processed by the processor 300. In step 1112, a second firmware that is configured to be executed on the communication device for the same hardware component is obtained, from the database 302, based on the second device function type, the second service type, and the second cost function. In step 1114, the second firmware is communicated to the communication device 204. In step 1116, a second set of service enabling instructions is activated (e.g., using the service enabling module 308) to enable a second service and a second functionality associated with the second firmware when the second firmware is executed on the communication device. The second service and the second functionality associated with the second firmware specific to a second service provider, are enabled for the same hardware component (e.g., for the same SIM). Activities performed on the first functionality and the second functionality may be analyzed using the activity analysing module 310. The activities include interaction with a payload. An advertisement targeted to the communication device may be delivered based on the activities (e.g., using the advertisement delivery module 312).

Similarly, the above methodology may be implemented for other services and functionalities to be enabled in the user device. Other inputs that may be processed may include (i) a communication device type (e.g., XYZ mobile communication device), (ii) a device identifier type (e.g., X01), (ii) a device function type (e.g., television), (iii) a service type (e.g., DTH service), (iv) a cost function (e.g., quality), a location (e.g., MG Road, Bangalore, India) or (v) combinations thereof. The appropriate firmware may be delivered to the user device 204 via a downloadable link, in one example embodiment. The user 202 of the user device 204 may click on the downloadable link to download and install the appropriate firmware. The appropriate firmware may be automatically installed on the user device 204 (without providing a downloadable link), in one example embodiment. The user 202 need not provide one or more inputs into the portal server 208 when the firmwares are locally stored in the user device 204.

A manufacturer of the user device 204 may collaborate with (i) the portal server 208, and/or (ii) the third party service operator who operates the portal server 208 to (i) integrate one or more firmwares onto the user device 204 or (ii) locally store the one or more firmwares onto the user device 204 during a manufacturing process. The one or more firmwares that are locally stored on the user device 204 can be accessed and installed to be used as one or more services. Each firmware may be used as at least one service (e.g., ISD calls), in one example embodiment. Each firmware (e.g., the same firmware) may be used as more than one service (e.g., a DTH service, and a broadband service), in another example embodiment. One or more services that are specific to the appropriate firmware (e.g., (i) downloaded and installed on the user device 204, or (ii) locally stored on the user device 204) are enabled (e.g., using the service enabling module 308) by the portal server 208. One or more keys may be stored at the portal server 208 or at the third party server that are used to enable the one or more services on the user device 204.

Figure 12:
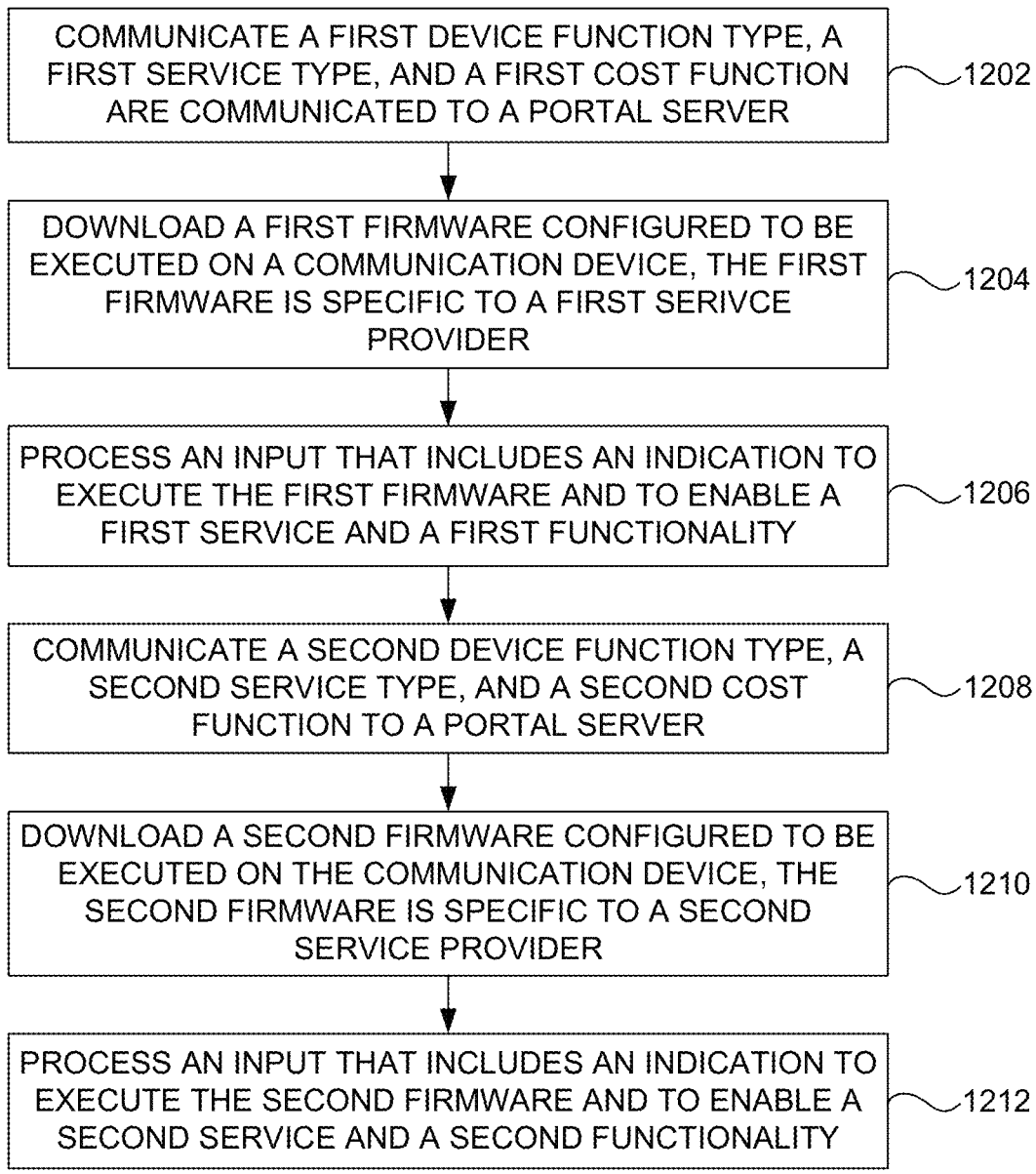
FIG. 12 is a flow diagram illustrating a method of performing services and functionalities across device types and service providers within the user device of FIG. 2 according to an embodiment herein.

FIG. 12, with reference to FIGS. 1 through 11, is a flow diagram illustrating a method of performing services and functionalities across device types and service providers within the user device 204 of FIG. 2 according to an embodiment herein. In step 1202, a first device function type, a first service type, and a first cost function are communicated to the portal server 208. The user device 204 (e.g., a communication device) includes a hardware component (e.g., the SIM) that is specific to a first service provider. In step 1204, a first firmware configured to be executed on the communication device is downloaded. In step 1206, an input that includes an indication to execute the first firmware is processed. A first service and a first functionality associated with the first firmware are enabled (e.g., using the service enabling module 308) for the hardware component when the first firmware is executed on the communication device. In step 1208, a second device function type, a second service type, and a second cost function are communicated to the portal server 208. In step 1210, a second firmware configured to be executed on the communication device is downloaded. In step 1212, an input that includes an indication to execute the second firmware is processed. A second service and a second functionality associated with the second firmware are enabled for the same hardware component when the second firmware is executed on the communication device. The first device function type and the second device function type are selected from a group that includes a television, a mobile communication device, a set-top-box, or home gateways. The first service type and the second service type are selected from a group that includes a local cable service, a free-to-air (FTA) terrestrial or satellite service, an IPTV service, an internet service, a call service, an SMS service, or any value added service. The first cost function and the second cost function are selected from a group that includes speed, performance, quality, reliability, price, or combinations thereof. The first device function type and the second device function type are different from each other.

The programmable transceiver 204A in the user device 204 may be general purpose digital signal processor that can be used for downloading the firmware to be used as a service. Multiple chipset may also be used to support functions like Broadcast TV reception, Modem functionality, radio reception, etc. This programmable chipset is powered by Software Defined Radio (SDR) architecture that has a modem virtualiser software layer and allows the user 202 to change the service providers by downloading appropriate firmware. Thus, it provides the users the flexibility to use various services (i) without having to be dependent on one service provider, and (ii) without having to change user device (e.g., changing a set top box for using other service provider, or changing a mobile communication device to use other functionalities such as GPS, 3G, 4G services, etc.). Further, this also gives the flexibility to the user 202 to pay per usage or be made available for free depending upon the payload (Video/Audio/Data), service rendered, and cost function.

In a mobile communication device with the programmable chipset (based on Software defined Radio (SDR) technology) there is no need of changing the chipset manually. Instead the same chip can be used and appropriate firmware can be downloaded from the portal server 208. The user can subscribe to any required band. For example, to play an FM radio the user downloads the appropriate firmware on to the user device. This eliminates the need for additional hardware components in the user devices for additional services and/or functionality. The same chipset can be used to download other firmwares on the same user device to user other functionalities/services.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A communication device for executing at least one firmware that is specific to at least one function and/or at least one service provided by at least one service provider, the communication device comprising:
   a processor;
   a memory storing (i) a database that stores the at least one firmware that is specific to the at least one function and/or the at least one service provided by the at least one service provider, (ii) one or more instructions to configure the processor, wherein the processor is configured by the one or more instructions to:
      receive at least one device function type, at least one service type, and at least one cost function from a user of the communication device;
      communicate the at least one device function type, the at least one service type, and the at least one cost function, received from the user to a portal server;
      download the at least one firmware that is configured to be executed on the communication device locally or remotely or from the portal server; and
      enable the at least one service and the at least one function associated with the at least one firmware for a hardware component that is specific to the at least one function and/or the at least one service upon the at least one firmware being executed on the communication device; and
   a programmable transceiver that comprises a modem virtualizer software layer that enables provision of the at least one function and/or the at least one service on the communication device by executing the at least one firmware without changing the hardware component of the communication device for every change in the at least one function and/or the at least one service provided by the at least one service provider,
   wherein the modem virtualizer software layer enables the at least one firmware executed on the communication device to be independent of an underlying hardware thereby providing a two-way communication modem functionality and at least one of (i) a broadcast transmission capability and (ii) a broadcast reception capability to the communication device, wherein the communication device enables the programmable transceiver to execute at least one of function and the at least one service depending upon the at least one firmware installed.

2. The communication device of claim 1, wherein the at least one device function type is selected from a group comprising a television, a mobile communication device, a set-top-box, home gateways or any communication devices.

3. The communication device of claim 1, wherein the at least one service type is selected from a group comprising a local cable service, a free-to-air (FTA) terrestrial or satellite service, an internet protocol television (IPTV) service, an internet service, and a call service.

4. The communication device of claim 1, wherein the at least one cost function is selected from a group comprising a speed, a performance, a quality, a reliability, a price, or combinations thereof.

5. A method for executing at least one firmware that is specific to at least one function and/or at least one service provided by at least one service provider at a communication device, the method comprising:
   receiving, by a processor, at least one device function type, at least one service type, and at least one cost function from a user of the communication device;
   communicating, by the processor, the at least one device function type, the at least one service type, and the at least one cost function, received from the user to a portal server;
   downloading, by the processor, the at least one firmware that is configured to be executed on the communication device locally or remotely or from the portal server;
   enabling, by the processor, the at least one service and the at least one function associated with the at least one firmware for a hardware component that is specific to the at least one function and/or the at least one service upon the at least one firmware being executed on the communication device;
   enabling, by a modem virtualizer software layer of a programmable transceiver communicatively associated with the communication device, provision of the at least one function and/or the at least one service on the communication device by executing the at least one firmware without changing the hardware component of the communication device for every change in the at least one function and/or the at least one service provided by the at least one service provider, wherein the modem virtualizer software layer enables the at least one firmware executed on the communication device to be independent of an underlying hardware thereby providing a two-way communication modem functionality and at least one of (i) a broadcast transmission capability and (ii) a broadcast reception capability to the communication device; and
   enabling the programmable transceiver to execute at least one of function and the at least one service depending upon the at least one firmware installed.

6. The method of claim 5, wherein the at least one device function type is selected from a group comprising a television, a mobile communication device, a set-top-box, home gateways or any communication devices.

7. The method of claim 5, wherein the at least one service type is selected from a group comprising a local cable service, a free-to-air (FTA) terrestrial or satellite service, an internet protocol television (IPTV) service, an internet service, and a call service.

8. The method of claim 5, wherein the at least one cost function is selected from a group comprising a speed, a performance, a quality, a reliability, a price, or combinations thereof.

* * * * *